(No Model.)

W. E. CARRINGTON & R. TIPPING.
Method of and Apparatus for Softening Hat Brims.

No. 240,231. Patented April 19, 1881.

Witnesses.

William Edward Carrington
and
Richard Tipping
Inventors,
by
John J. Halsted
Atty.

UNITED STATES PATENT OFFICE.

WILLIAM E. CARRINGTON AND RICHARD TIPPING, OF STOCKPORT, COUNTY OF CHESTER, ENGLAND.

METHOD OF AND APPARATUS FOR SOFTENING HAT-BRIMS.

SPECIFICATION forming part of Letters Patent No. 240,231, dated April 19, 1881.

Application filed February 14, 1881. (No model.)

*To all whom it may concern:*

Be it known that we, WILLIAM EDWARD CARRINGTON and RICHARD TIPPING, subjects of the Queen of Great Britain, both residing at Stockport, in the county of Chester, England, have invented a new and Improved Method of and Apparatus for Softening Hat-Brims, previous to curling the same, of which the following is a specification.

This invention relates to a method of softening the required portion of the hat-brims (previous to curling the same) by the employment of free steam, in combination with a suitable construction of apparatus, such as is hereinafter described; and the invention is applicable for softening hat-brims of hard or soft felt, or of silk hats, or of any other material.

The apparatus consists, principally, of a cam having a reciprocating or revolving motion communicated to it; of an expanding brow-block, susceptible of being adjusted to suit hats of different sizes; of a peculiar construction of perforated steam-chest, and of a rack and pinion for adjusting the steam-chest. The cam may be of any suitable form or shape which will conform to the proportion of the hat-brim required to be softened. The rack and pinion are in connection with a perforated steam-chest, so as to allow the adjustment of the steam-chest to suit hats of different sizes and width of brim, and also to allow of regulating the perforated steam-chest so as to only soften the required width of brim. The perforated steam-chest is of peculiar construction, as hereinafter described, the hat-brim passing between two lips of the chest, so as to allow both surfaces of the brim to be operated on by free steam.

To make our invention better understood, we will proceed to describe the same by reference to the accompanying drawings, in which—

Figure 2:
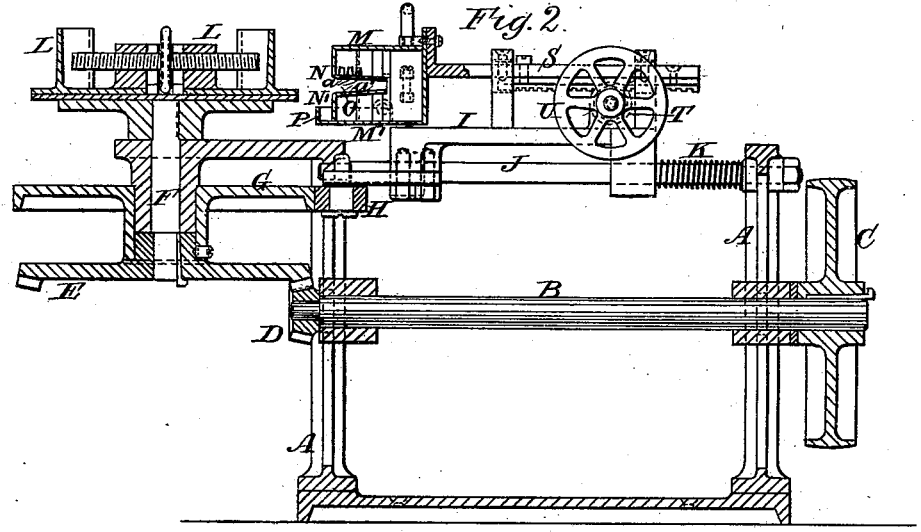
Figure 1:
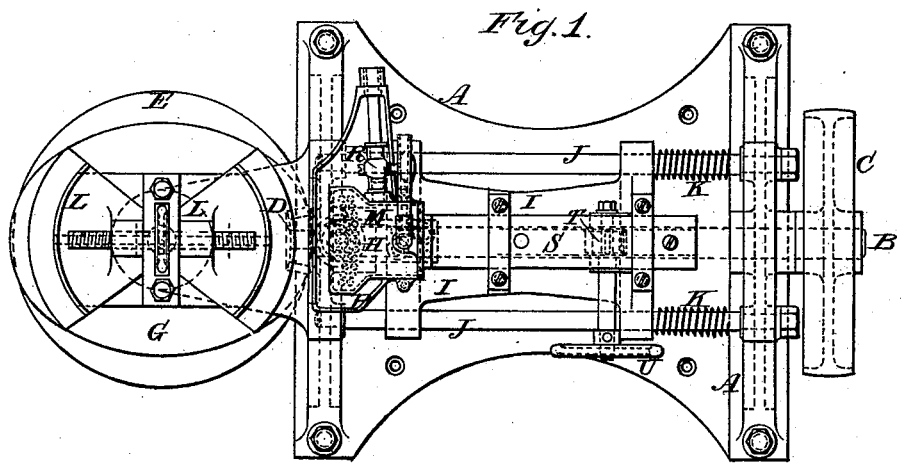
Figure 3:
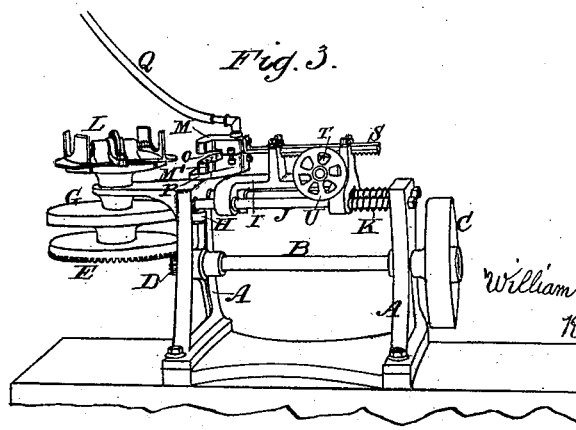

Figure 1 is a plan, and Fig. 2 a sectional elevation, of the improved apparatus for carrying out our improved method of softening hat-brims. Fig. 3 is a perspective view of the same.

Similar letters in all the figures represent similar parts.

A A A is the frame-work of the machine, carrying the main shaft B, having the driving-pulley C at one end, and driven from any suitable motive power. The other end of the shaft B carries the bevel-pinion D, gearing with the bevel-wheel E on the lower end of the vertical shaft F, which we call the "cam-shaft."

G is the cam, of the form or shape hereinbefore described. Against the periphery of the cam G presses the friction-roller H, fixed to the carriage I sliding on the guides J J.

K K are springs on the guides J J, which serve to press forward the sliding-carriage I, and thereby keep the roller H in continual contact with the periphery of the cam G.

On the top of the cam-shaft F is fixed the brow-block L L, actuated by a right-and-left-handed screw, so as to form the "size" of any hat. This brow-block is of ordinary known construction.

The steam-chest is constructed of two parts, M M', bolted together and fixed to a bracket on the sliding carriage I.

N N' are the two lips of the steam-chest, perforated at *a a a* and *a' a' a'*, the brim of the hat passing into the space O between the two lips.

P is a trough or gutter for collecting and carrying off the condensed steam.

Q is a flexible pipe for supplying the steam from any source; R, stop-cock; S and T, rack and pinion for the purpose of moving the steam-chest to and fro in a horizotal plane, so as to allow of adjusting it to suit the different sizes of hats, width of brim, and the various proportions of the brim to be softened; U, hand-wheel for operating the pinion T.

The hat, the whole or part of the brim of which is required to be softened, is placed on the brow-block L, (previously adjusted to size,) and the hand-wheel U is turned so as to advance the steam-chest until the brim of the hat passes between the two lips N N' of the steam-chest. The stop-cock R is turned on and the machine is put in motion, and after a few turns of the hat the softening of the brim will be effected. The steam-chest is then run back, the hat is removed from the brow-block, and is ready for curling.

It will be understood from the preceding description that the friction-roller H being kept in constant contact with the periphery of the cam G, it follows that the cam G, in revolving, will give a to-and-fro motion to the sliding carriage and steam-chest, so as to cause only that part of the brim which is to be softened to be acted on by the steam from the steam-chest.

Having thus described our said invention and the best means with which we are acquainted for carrying the same into effect, we wish it to be understood that we do not confine ourselves to the precise details herein laid down, and shown in the accompanying drawings, as the same may be varied without departing from the peculiar character of our invention; but

What we do claim is—

1. An improved apparatus for softening the required portions of hat-brims previous to curling, such apparatus consisting of a suitably-shaped cam having a reciprocating or revolving motion, in combination with an expanding brow-block and adjustable perforated steam-chest for supplying free steam, the whole arranged and operating substantially in the manner and for the purposes hereinbefore described, and represented in the accompanying drawings, or any mere modification thereof.

2. The method herein described of softening the required portion of hat-brims, previous to curling, by projecting or showering free steam on such portions only, as hereinbefore described.

3. In a machine for softening hat-brims, a cam, as and for the purpose specified.

4. In a machine for softening the required portion of hat-brims, the perforated steam-chest, adapted for steaming such portions only, and having a reciprocating movement, substantially as and for the purpose specified.

W. E. CARRINGTON.
RICHARD TIPPING.

Witnesses:
J. B. ANDERSON,
ARTHUR C. HALL,
9 Maud Street, Manchester, England.